US006531421B2

(12) United States Patent
Hockman

(10) Patent No.: US 6,531,421 B2
(45) Date of Patent: *Mar. 11, 2003

(54) METHOD OF REDUCING THE AMOUNT OF LITHIUM IN GLASS PRODUCTION

(75) Inventor: John Albert Hockman, Bath, PA (US)

(73) Assignee: Specialty Minerals (Michigan) Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/878,643

(22) Filed: Jun. 11, 2001

(65) Prior Publication Data

US 2002/0198092 A1 Dec. 26, 2002

(51) Int. Cl.⁷ .............. C03C 6/02; C03C 6/08
(52) U.S. Cl. .......... 501/27; 501/29; 65/29.16; 65/135.9
(58) Field of Search ............ 501/27, 29; 65/29.16, 65/135.9

(56) References Cited

U.S. PATENT DOCUMENTS

| | | | |
|---|---|---|---|
| 3,001,884 A | * | 9/1961 | Slayter ............ 501/27 |
| 3,381,064 A | | 4/1968 | Yamaguchi |
| 3,458,331 A | | 7/1969 | Kroyer |
| 3,520,705 A | | 7/1970 | Shido et al. |
| 3,802,901 A | | 4/1974 | Robertson et al. |
| 3,817,776 A | | 6/1974 | Gringas |
| 3,875,288 A | | 4/1975 | Hoffman et al. |
| 3,883,364 A | | 5/1975 | Robertson et al. |
| 3,926,647 A | | 12/1975 | Wuhrer |
| 3,941,574 A | | 3/1976 | Melkonian et al. |
| 3,956,446 A | | 5/1976 | Eirich et al. |
| 3,967,943 A | | 7/1976 | Seeley |
| 3,969,100 A | | 7/1976 | Kuna et al. |
| 4,023,976 A | | 5/1977 | Bauer et al. |
| 4,026,691 A | | 5/1977 | Lovett et al. |
| 4,028,131 A | | 6/1977 | Pons |
| 4,110,097 A | | 8/1978 | Chevallier et al. |
| 4,252,754 A | | 2/1981 | Nakaguchi |
| 4,474,594 A | | 10/1984 | Lazet |
| 4,519,814 A | | 5/1985 | Demarest, Jr. |
| 4,612,292 A | | 9/1986 | Richard |
| 4,634,461 A | | 1/1987 | Demarest, Jr. et al. |
| 4,920,080 A | | 4/1990 | Demarest, Jr. |
| 5,004,706 A | | 4/1991 | Dickinson |
| 5,100,840 A | | 3/1992 | Urabe et al. |
| 5,422,320 A | | 6/1995 | Adams, Jr. et al. |
| 5,900,052 A | | 5/1999 | Nakajima et al. |
| 6,211,103 B1 | | 4/2001 | Tomaino et al. |
| 6,271,159 B1 | * | 8/2001 | Fairchild et al. ............ 501/27 |
| 6,287,378 B1 | | 9/2001 | Fairchild et al. |
| 6,287,997 B1 | * | 9/2001 | Fairchild et al. ............ 501/27 |
| 6,336,346 B2 | * | 1/2002 | Tomaino et al. ............ 65/21.2 |

FOREIGN PATENT DOCUMENTS

| | | |
|---|---|---|
| DE | 42 28 500 | 9/1992 |
| JP | 53-139621 | 12/1978 |
| JP | 55 149122 | 5/1979 |
| JP | 59 64563 | 4/1984 |
| JP | 2 141454 | 5/1990 |
| JP | 10 291852 | 11/1998 |
| RU | 644 731 | 1/1979 |
| RU | 823 285 | 4/1981 |
| RU | 981 217 | 12/1982 |
| RU | 340 257 | 5/1983 |

OTHER PUBLICATIONS

"Glass", Kirk–Ohmer, Encyclopedia of Chemical Technology, 4$^{th}$ Edition 1994, vol. 12, pp. 555–569, 593–601.

Mirkovich, V.V.; "Utilization of Diopside in the Manufacture of Glass," *Mines Branch Technical Bulletin TB 192;* Dept. of Energy, Mines and Resources (Ottawa, Canada 1974).

Mirkovich, V.V. et al; "Utilization of Diopside in the Manufacture of Glass, Part II"; *Journal of the Canadian Ceramic Society;* vol. 44, pp. 43–47; (1975).

* cited by examiner

Primary Examiner—Karl Group
(74) Attorney, Agent, or Firm—Marvin J. Powell

(57) ABSTRACT

A method is provided for producing a glass batch. The method involves use of a calcium magnesium silicate as a batch component substitution for a lithium melting aid. The amount used is effective to produce a beneficial viscosity character and reduced batch free time.

6 Claims, No Drawings

METHOD OF REDUCING THE AMOUNT OF LITHIUM IN GLASS PRODUCTION

FIELD OF THE INVENTION

The present invention relates to glass batch forming methods. In particular, it relates to a method wherein a calcium magnesium silicate is substituted for lithium as a melting aid in glass batches.

BACKGROUND

Glass batches can contain certain materials as melting aids. These aids assist in creating a homogeneous batch having complete reactions and performed at lower melting temperatures or times. One such melting aid is lithium, which while effective is relatively expensive to use. There remains a need to further develop useful melting aids which can be used in conjunction with or in the absence of lithium compounds.

SUMMARY

One object of the present invention is a method of producing a glass batch composition having favorable viscosity characteristics. Another objective is to provide a melting aid for a glass batch which can work in conjunction with or as a partial or total replacement for lithium melting aids. These and other objectives are achieved by a method of forming a glass batch composition by the admixing of a calcium magnesium silicate composition.

DESCRIPTION OF PREFERRED EMBODIMENTS

One embodiment of the present invention is a method of producing a glass batch composition composed of a calcium magnesium silicate and other glass components to produce a glass batch. The glass batch composition is then melted to form a melted glass batch composition. The amount of said calcium magnesium silicate used is selected effectively to produce a viscosity character and batch free time in the glass batch composition less than or equal to that which results from use of an equivalent amount of a lithium compound in a comparative glass batch. An equivalent amount is the use of the same mass percent of the calcium magnesium silicate or lithium compound in the total glass batch before heating.

The calcium magnesium silicate of the present invention can be a natural resource or one attained by synthetic production. A preferred calcium magnesium silicate compound is that described in U. S. Pat. No. 6,211,103 B1 (Fairchild, et al.). A more preferred calcium magnesium silicate has an empirical formula of $Ca_xMg_ySiO_2$, and the values of x and y are independently from about 0.1 to about 0.6 and z is a value to balance the oxidation state of the compound.

The respective amounts of the calcium magnesium silicate compound and other glass components is dependent upon the glass formula being produced. As used herein, the term "comparative glass batch" or "comparative glass product" means a glass batch or product which is equivalent in oxide values, except that the value of boron oxide equivalent is less for an embodied glass product made with the present invention than that made with known processes which do not use a calcium magnesium silicate compound as described herein. It has been unexpectedly discovered that by using the calcium magnesium silicate compound described herein that less lithium values are needed to attain the same or better result as the amount used in known methods. Accordingly, a preferred method is one in which the other batch components comprise less than about one percent by total batch weight of lithium. It was further unexpectedly found that in the method using calcium oxide silicate compounds to reduce the amount of lithium needed for a particular purpose, that the use of an embodied calcium magnesium silicate compound enabled as a preferred method to reduce the amount of said magnesium oxide compound to about zero.

The amount of the calcium magnesium silicate compound used can be adjusted so that the viscosity of the formed glass batch is at least about ten percent less than that of the comparative glass batch. Similarly, the amount of the calcium magnesium silicate compound used can be adjusted so that the batch free time of the formed glass batch is at least about ten percent less than that of the comparative glass batch.

In a preferred method, an amount of feldspathic compound can be combined with the calcium magnesium silicate compound to achieve similar results. In another preferred embodiment, the above method is modified by the additional mixing of a feldspathic component. Such feldspathic material can be of one of any of the numerous material or synthetic forms of feldspar or feldspar-type material. Such feldspathic material is an aluminosilicate with barium, calcium, potassium, or sodium component preferably is a potassium aluminosilicate having the formula $KAlSi_3O_8$ with little sodium values.

The following examples are intended to illustrate, but not limit, the invention herein.

An inventive sample is made by adding together feldspar, calcium magnesium silicate and other glass forming components. The calcium magnesium silicate is Synsil® silicate, from Synsil Products Inc., and has the following composition:

| Oxide Component | Mass Percent |
| --- | --- |
| CaO | 24.5 |
| MgO | 17.8 |
| $SiO_2$ | 53.5 |
| $Al_2O_3$ | 3.4 |
| $Fe_2O_3$ | 0.12 |
| $Na_2O$ | 0.40 |

The feldspar is a potassium aluminosilicate. Of the glass produced from the glass batch, the Synsil® silicate is 13 mass percent, the feldspar is 3 mass percent, and the other glass forming components are 84 mass percent. A comparative batch is produced using 7 mass percent dolomite, 5 mass percent spodumene, and the balance being the other glass forming components. A comparison of the glasses produced show that the experimental glass is produced with reduced batch free time while retaining similar glass properties as the comparative glass.

What is claimed is:

1. A method of producing a glass batch composition, said method comprising forming a glass batch, said glass batch comprising a calcium magnesium silicate wherein the calcium magnesium silicate has an empirical formula of $Ca_xMg_ySiO_2$, and the values of x and y are independently from about 0.1 to about 0.6 and z is a value to balance the oxidation state of the compound, and other glass components to produce said glass batch, and then melting said batch to form a melted glass batch composition, wherein the amount of said calcium magnesium silicate is effective to produce a viscosity and batch free time in said melted glass batch composition less than or equal to that which results from use of an equivalent amount of a lithium composition in a comparative glass batch.

2. The method of claim 1 wherein said other batch components comprises less than about one percent by total batch weight of lithium.

3. The method of claim 2 wherein the lithium amount is about zero.

4. The method of claim 1 wherein the viscosity of the melted glass batch composition is at least about ten percent less than that of the comparative glass batch.

5. The method of claim 1 wherein the batch free time of the melted glass batch composition is at least about ten percent less than that of the comparative glass batch.

6. The method of claim 1 further comprising adding feldspathic minerals.

* * * * *